US012632819B2

(12) United States Patent
Reczek et al.

(10) Patent No.: US 12,632,819 B2
(45) Date of Patent: May 19, 2026

(54) APPARATUS AND METHOD FOR FREIGHT LOGISTICS MANAGEMENT

(71) Applicant: PITT-OHIO, Pittsburgh, PA (US)

(72) Inventors: Christina Reczek, Pittsburgh, PA (US); Scott Greacen, Pittsburgh, PA (US)

(73) Assignee: Pitt-Ohio, Pittsburgh, PA (US)

( * ) Notice: Subject to any disclaimer, the term of this patent is extended or adjusted under 35 U.S.C. 154(b) by 0 days.

(21) Appl. No.: 18/426,240

(22) Filed: Jan. 29, 2024

(65) Prior Publication Data

US 2025/0245604 A1     Jul. 31, 2025

(51) Int. Cl.
G06Q 10/083          (2024.01)

(52) U.S. Cl.
CPC .................................. G06Q 10/083 (2013.01)

(58) Field of Classification Search
CPC ...... G06Q 10/083; G06Q 50/40; G06Q 50/60; G06Q 10/087; G06Q 10/0841; G06Q 10/0843; G06Q 10/08365; G06Q 30/0633; G06Q 30/0635
See application file for complete search history.

(56) References Cited

U.S. PATENT DOCUMENTS

| | | | | |
|---|---|---|---|---|
| 9,965,739 | B2 | 5/2018 | Moir | |
| 10,893,107 | B1 * | 1/2021 | Callari | ................ G06F 18/2115 |
| 11,379,788 | B1 * | 7/2022 | Wagner | ................. G06F 3/0486 |
| 11,526,947 | B2 | 12/2022 | Jones | |
| 2018/0232693 | A1 * | 8/2018 | Gillen | ................ G06Q 10/0834 |
| 2022/0147925 | A1 * | 5/2022 | Chiang | ............ G06Q 10/06315 |
| 2022/0301045 | A1 * | 9/2022 | Yoshida | ............. G06Q 30/0645 |

| | | | | |
|---|---|---|---|---|
| 2022/0327482 | A1 | 10/2022 | Meanor | |
| 2023/0004931 | A1 * | 1/2023 | Con | ........................ G06N 3/088 |
| 2023/0169447 | A1 * | 6/2023 | Vaidyanathan | ...... G06Q 10/083 |
| | | | | 705/7.28 |

FOREIGN PATENT DOCUMENTS

WO      WO 2022/263798 A1 * 12/2022   ............. G06Q 10/08

OTHER PUBLICATIONS

Indian Transportation & Logistics, "AI Provides Vital Assistance to TMS Companies," Indian Transportation & Logistics, Jul. 24, 2023.*

* cited by examiner

*Primary Examiner* — Nathan Erb
(74) *Attorney, Agent, or Firm* — Caldwell LLC

(57)               ABSTRACT

An apparatus and method for freight logistics management, the apparatus including a processor and a memory communicatively connected to the processor. The memory includes instructions configuring the processor to receive a freight data associated with a freight request, obtain a predetermined data, generate an adjusted waybill data comprising receiving adjusted waybill training data comprising a plurality of freight data correlated to a plurality of adjusted waybill data, training an adjusted waybill machine learning model as a function of the adjusted waybill training data, and generating the adjusted waybill data using the adjusted waybill machine learning model. The memory also includes instructions to compare the predetermined data to the adjusted waybill data, determine an updated freight schedule as function of the adjusted waybill data and the freight data, and transmit the updated freight schedule and the adjusted waybill data.

16 Claims, 8 Drawing Sheets

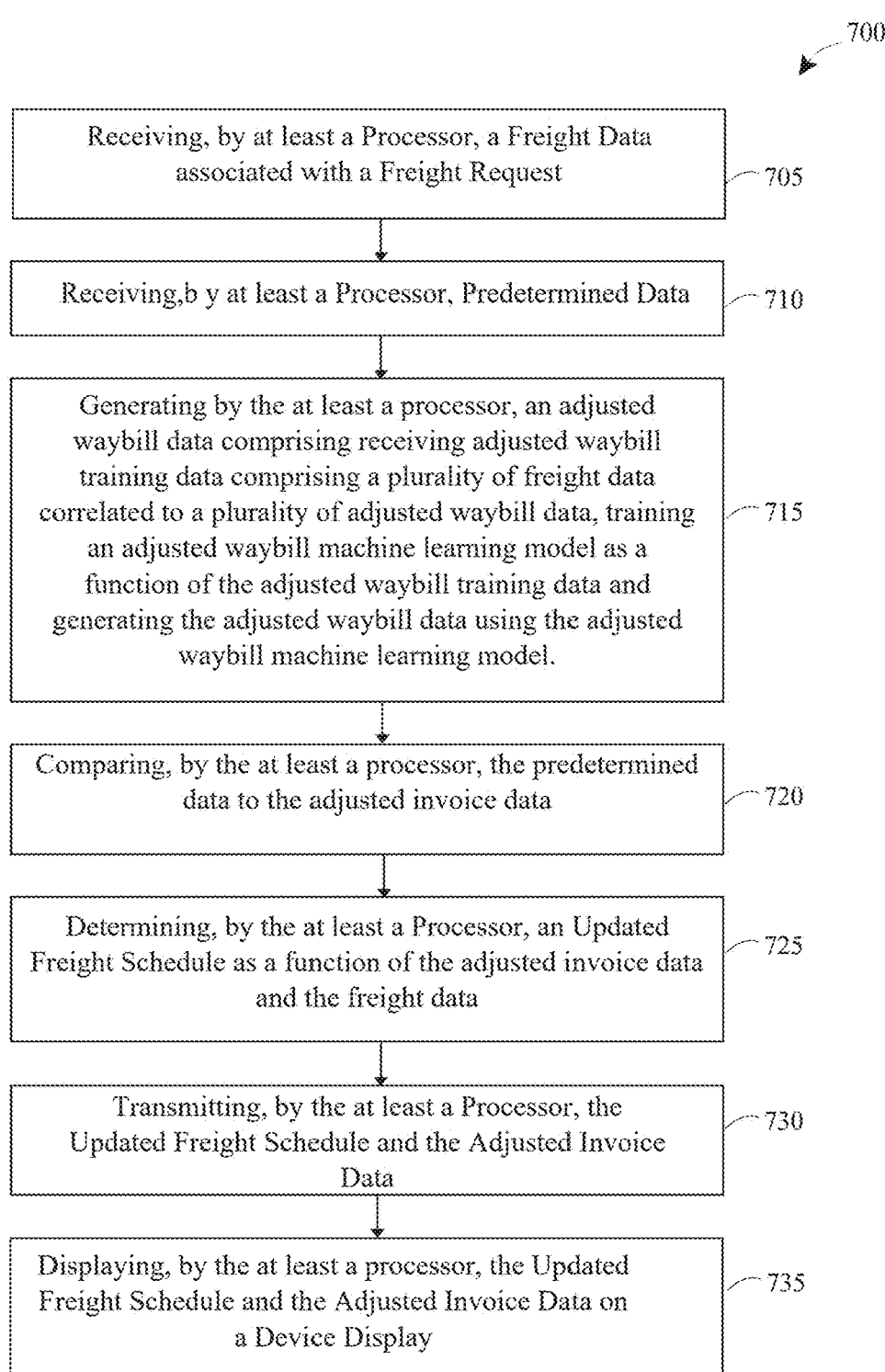

700

Receiving, by at least a Processor, a Freight Data associated with a Freight Request — 705

Receiving,b y at least a Processor, Predetermined Data — 710

Generating by the at least a processor, an adjusted waybill data comprising receiving adjusted waybill training data comprising a plurality of freight data correlated to a plurality of adjusted waybill data, training an adjusted waybill machine learning model as a function of the adjusted waybill training data and generating the adjusted waybill data using the adjusted waybill machine learning model. — 715

Comparing, by the at least a processor, the predetermined data to the adjusted invoice data — 720

Determining, by the at least a Processor, an Updated Freight Schedule as a function of the adjusted invoice data and the freight data — 725

Transmitting, by the at least a Processor, the Updated Freight Schedule and the Adjusted Invoice Data — 730

Displaying, by the at least a processor, the Updated Freight Schedule and the Adjusted Invoice Data on a Device Display — 735

*FIG. 7*

APPARATUS AND METHOD FOR FREIGHT LOGISTICS MANAGEMENT

FIELD OF THE INVENTION

The present invention generally relates to the field of freight transportation services. In particular, the present invention is directed to an apparatus and method for freight logistics management.

BACKGROUND

Modern transport providers have many transports that need to be tracked and these transport providers need to understand the characteristics of the freight they are carrying. Current systems for tracking freight are inefficient, susceptible to human error and contain numerous security risks.

SUMMARY OF THE DISCLOSURE

In an aspect, an apparatus for freight logistics management is disclosed. Apparatus includes at least a processor and a memory communicatively connected to the at least a processor. The memory contains instructions configuring the at least a processor to receive a freight data associated with a freight request and to obtain a predetermined data. The memory further contains instructions to generate an adjusted waybill data. Generating the adjusted waybill data comprises receiving adjusted waybill training data comprising a plurality of freight data correlated to a plurality of adjusted waybill data, training an adjusted waybill machine learning model as a function of the adjusted waybill training data, and generating the adjusted waybill data using the adjusted waybill machine learning model. The memory further contains instructions to compare the predetermined data to the adjusted waybill data and determine an updated freight schedule as a function of a adjusted waybill data and the freight data. Further, the memory contains instructions to transmit the updated freight schedule and the adjusted waybill data. The apparatus further includes a device display communicatively connected to the processor. The device display is configured to output the updated freight schedule and the adjusted waybill data.

In yet another aspect, a method of freight logistics management is disclosed. The method includes receiving, by at least a processor, a freight data associated with a freight request, receiving a predetermined data, and generating an adjusted waybill data. Generating the adjusted waybill data includes receiving adjusted waybill training data comprising a plurality of freight data correlated to a plurality of adjusted waybill data, training an adjusted waybill machine learning model as a function of the adjusted waybill training data and generating the adjusted waybill data using the adjusted waybill machine learning model. The method further includes, comparing, by at least the processor, the adjusted waybill data to the predetermined data, determining, by the at least a processor an updated freight schedule as a function of the adjusted waybill data and the freight data and transmitting, by the at least a processor, the updated freight schedule and the adjusted waybill data. The method further includes displaying, by the at least a processor, an updated freight schedule and the adjusted waybill data on a device display.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein

FIG. 7 is a flow diagram illustrating an exemplary embodiment of a method for line haul logistics management in accordance with one or more embodiments of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for freight logistics management. In various embodiments, apparatus and methods for freight logistics management may be used to receive freight data and output costs associated with the freight data. The freight data may also be compared to previously recorded freight data and output discrepancies. For example, and without limitation, freight data may be gathered, and an adjusted waybill data may be calculated by computing device. Computing device may then update existing reports to correct any discrepancies or inconsistencies in previous freight data recordings. In some embodiments, the freight data may be received by an input device. The input device may further comprise an augmented reality device. In one or more embodiments, an adjusted waybill data may be generated. The adjusted waybill data may include, freight size, weight, materials, fragility, warnings, proper freight procedure, and pricing associated with the freight. In one or more embodiments, an updated freight schedule maybe generated. The updated freight schedule may include shipping destinations, vehicles used for shipping a freight, routes, times frames and the like.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
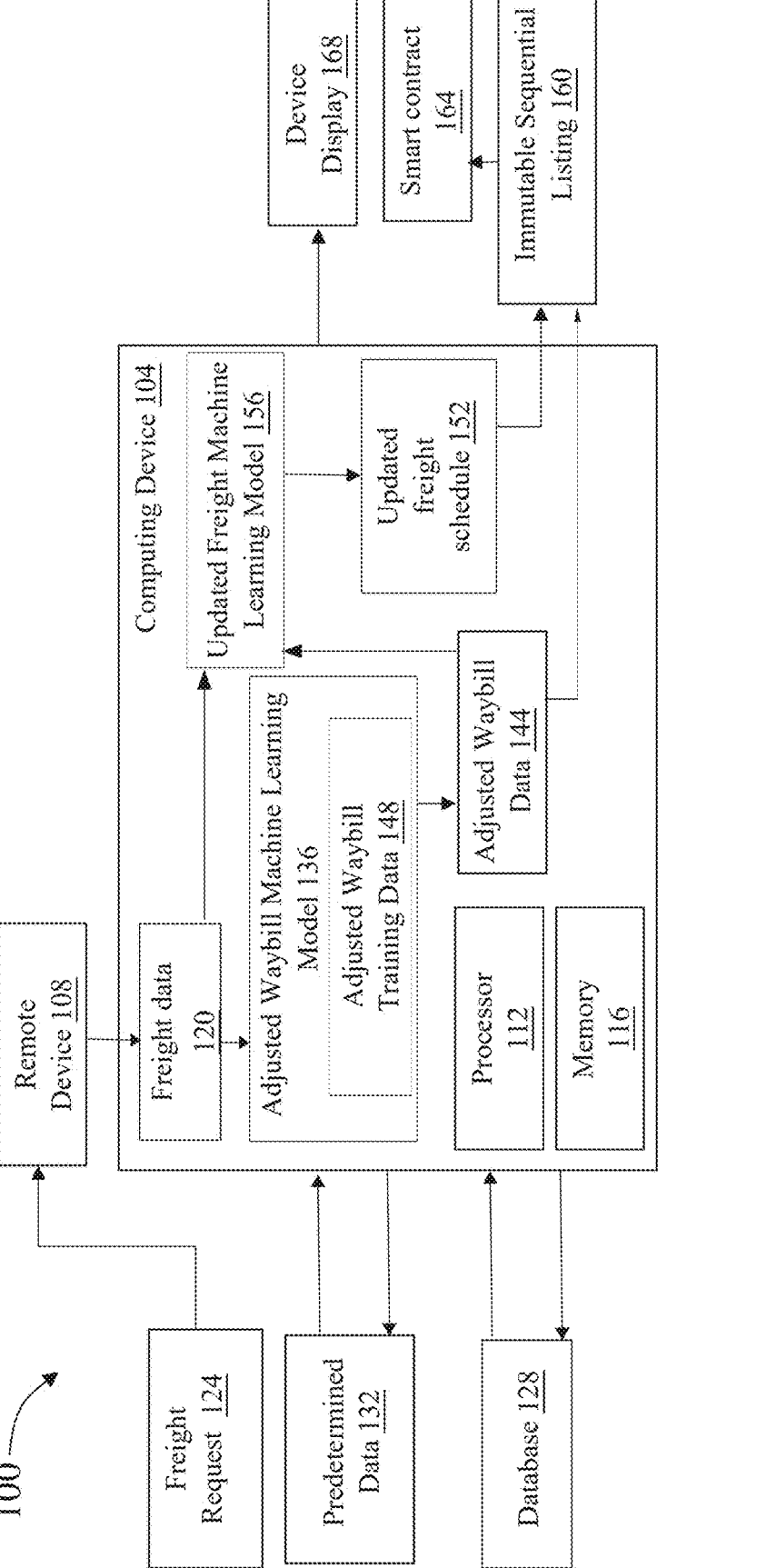
FIG. 1 is a block diagram of an exemplary embodiment of an apparatus for freight logistics management in accordance with one or more embodiments of the present disclosure.

Referring now to FIG. 1, an exemplary embodiment of an apparatus 100 for freight logistics management is disclosed. In one or more embodiments, apparatus 100 includes a computing device 104. Computing device 104 may include any computing device 104 as described in this disclosure, including, and without limitation, a microcontroller, microprocessor, processor 112, computing system, digital signal processor (DSP), control chip, and/or system on a chip (SoC) as described in this disclosure. Computing device 104 may include, be included in, and/or communicate with a mobile and/or remote device 108 such as a mobile telephone, smartphone, tablet, laptop, and the like. Computing device 104 may include a single computing device 104 operating independently, or may include two or more computing devices operating in concert, in parallel, sequentially, or the like. Two or more computing devices may be included together in a single computing device 104 or in two or more computing devices. Computing device 104 may interface or communicate with one or more additional devices as described below in further detail via a network interface device. For example, and without limitation, computing device 104 may be communicatively connected to one or more remote devices. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104, and/or components thereof, may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In one or more embodiments, computing device 104 may include components such as a processor 112, a memory 116, a display, or other components, such as for example and without limitation, sensors. In one or more embodiments, each component may be communicatively connected to one or more of the other components of computing device 104 and/or a remote device 108, such as remote device 108 (e.g., remote user device). For example, and without limitation, memory 116 may be communicatively connected to processor 112. In one or more embodiments, memory 116 of computing device 104 contains instructions configuring processor 112 to execute any of the steps, processes, and/or methods described in this disclosure. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a computing device 104 to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, memory 116 contains instructions configuring processor 112 to receive a freight data 116 associated with freight request 124 for a transport. "Freight data" as described in this disclosure is the information or characteristics relating to a freight. For example, Freight data 120 may include a freight weight or freight dimensions. For the purposes of this disclosure, a "freight request" is a communication requesting transport information of a freight such as freight data 120. For example, and without limitation, a freight request 124 may include a communication from an operator or a driver requesting data associated with the weight or dimensions of cargo or freight that is being transported. In one or more embodiments, freight request 124 may be transmitted by a remote device 108. For the purposes of this disclosure, a "remote device 108" is a device located remote to apparatus 100. Remote device 108 may include a user device, such as a smartphone, mobile phone, laptop computer, desktop computer, tablet, any of computing device 104 and/or system described in this disclosure, and the like. Additionally, without limitation, more descriptions on freight data 120 may be found in U.S. patent application Ser. No. 18/426,217, filed on Jan. 29, 2024, and entitled "APPARATUS AND METHOD FOR LINE HAUL LOGISTICS MANAGEMENT," the entirety of which is incorporated by reference herein in its entirety.

In one or more embodiments, freight data 120 includes information relating to a freight and the transportation of a freight. For example, and without limitation, freight data 120 may include freight dimensions, weight, size, inspection data, shipping destination, shipping origin, material properties of the goods within a freight and the like, Freight data 120 may also include safety information relating to the freight being transported, warnings, procedures for proper handling, transport history, and the like. Freight data 120 may further include costs associated with the freight, information relating to the owner of the freight, information relating to the carrier of the freight, contract negotiations relating to the freight and the like.

In various embodiments, freight data 120 may be input into computing device 104 by a user using, such as, for example, a peripheral input device (e.g., keyboard) or an integrate input component (e.g., touchscreen of computing device). For example, and without limitation, a user may input freight data 120 into computing device 104 via graphical user interface or web application using a keyboard. In other embodiments, freight data 120 may be provided from historical data, such as data collected by sensors or past recorded data related to similar freight. For example, and without limitation, one or more sensors communicatively connected to computing device 104 may detect the dimensions of a freight and send the dimensions to computing device 104 for storage in database. In other embodiments, freight data 120 may be retrieved from a remote database, such as, for example, a website, academic database, government database, or the like. In other embodiments, freight data 120 may be provided using a freight machine-learning module, where freight machine-learning module generates a freight machine-learning model using freight training data which may be inputted by a user or provided from a freight database. Freight machine-learning module may be generated using methods described in this disclosure. For example, and without limitation, freight machine-learning model may be generated using inputs, dimensions of a freight, correlated to outputs, such as freight data 120 elements. Such training data may be used to determine a correlation between dimensions and freight data 120 and may be used to train freight machine-learning model. In an embodiment, freight data 120 may be generated using a sensor. For example, freight data 120 may be generated by scanning the transport being shipped, such as scans of RFID tags at each step of the shipping schedule.

With continued reference to FIG. 1, remote device 108 may include an augmented reality device wherein freight data 120 may be generated using augmented reality device. "Augmented reality" device, as used in this disclosure, is a device that permits a user to view a typical field of vision of the user and superimposes virtual images on the field of vision. Augmented reality device may include a field camera. A "field camera," as used in this disclosure, is an optical device, or combination of optical devices, configured to capture a field of vision as an electrical signal, to form a digital image. Augmented reality device may utilize the field camera to capture a field of vision of a freight and form a digital image of the freight. Augmented reality device may then be configured to generate and/or classify images to output image-based measurements referring to the freight data 120. Augmented reality device will be described in further detail below.

In one or more embodiments, freight request 124 may include an electronic communication from an operator where an operator may be the person or company that is managing the transportation of the freight. For example, and without limitation, an operator may include the driver of the freight, or an employee of the freight driver tasked with managing freight requests. In various embodiments, freight request 124 may include a text, email, generated form, answered prompt, voice recording, video instruction, and the like. freight request 124 may include textual, audio, or visual data and/or information. In one or more embodiments, freight request 124 may include a request for freight data 120. Freight request 124 may also include a request for shipment information related to a freight (e.g., product), a destination, a time, and the like, as discussed further. In one or more embodiments, shipment information may include details related to the shipment, such as a quantity of shipments included in the delivery, departure location, destination location, freight characteristics (e.g., parts and/or items to be included in each shipment and associated quantity and size of each part included), and the like.

In one or more embodiments, a transport may include the process of moving a freight (e.g. wood) from one location to another using a transport vehicle. A "transport vehicle" as used in this disclosure is a machine capable of moving one or more objects between one or more locations. In some embodiments, a transport vehicle may include, but is not limited to, a freight carrier, a truck, a car, a boat, a plane, a motorcycle, and the like. A transport vehicle may be configured to operate through, but is not limited to, air, land, sea, and the like. A transport vehicle may be configured to engage in one or more steps of a transport. In some embodiments, a transport vehicle may engage in pickup, delivery, and/or line haul operations. In some embodiments, a transport vehicle may include, but is not limited to, Less than Truckload ("LTL") and/or Full Truckload ("FTL") freight delivery. In various embodiments, a transport vehicle may be controlled and/or operated by an operator. An "operator," for the purposes of this disclosure, is a person that uses a transport vehicle. The transport vehicle may be used to transport objects from one location to another. Objects may include, as non-limiting examples, cargo, goods, produces, livestock, non-fungible goods, fungible goods, produce, cargo containers, oil, liquids, gasoline, food, meals, people, and the like.

With continued reference to FIG. 1, memory 116 contains instructions to obtain a predetermined data 132. Predetermined data 132 may be any previously recorded data referring to a freight and shipment details of the freight. "Previously recorded" as used in this disclosure refers to the recordation of data of a freight on a previous date, time, or by another individual. For example, predetermined data 132 may refer to data recorded when a freight was received at a first location wherein the freight is now present at a second location. Predetermined data 132 may also be data referring to a freight prior to the freight leaving a first location. In one or more embodiments, predetermined data 132 may include time data (e.g., departure and arrival date of shipment), vehicle data (e.g., make and model of a vehicle), cargo data (e.g., dimensions of cargo, weight of cargo, and the like), rate data (e.g., rate of travel (mph)), geographical data (e.g., surface gradient, surface type, and the like), condition data, and the like (e.g., ambient temperatures, weather conditions, and the like). "Time data," for the purposes of this disclosure, is temporal information relating to the shipment of goods. In one or more embodiments, time data may include temporal information such as a date and time related to a shipment of goods. For example, and without limitation, time data may include an estimated date and time related to a departure of a transportation vehicle with goods from an initial location, and time data may also include an estimated date and time related to an arrival of a transportation vehicle with goods to a destination. Time data may also include temporal data related to estimated intermediate stops or checkpoints of transportation vehicle during the shipment of goods. For the purposes of this disclosure, "vehicle data" is data related to a transport vehicle. In another example, and without limitation, vehicle data may include vehicle data related to estimated transportation vehicles (also referred to in this disclosure as a "vehicle") that may be used to move the desired goods of a customer. Vehicle data may include a vehicle type, weight, dimensions, and the like. For the purposes of this disclosure, "cargo data" is data relating to goods desired to be transported by a transportation vehicle. In one or more embodiments, cargo data may include information related to goods desired by the customer to be transported by a transportation vehicle. Cargo data may include dimensions, weight, quantity, and the like of the freight. For the purposes of this disclosure, "rate data" is data concerning an estimated rate of travel of a transport vehicle. In another example, and without limitation, in one or more embodiments, rate data includes information related to a rate of travel of a transportation vehicle moving goods desired by a customer. For example, and without limitation, rate data may include a 55-miles per hour speed of a transportation vehicle. In one or more embodiments, geographic data may include estimated environmental or terrain information. For example, and without limitation, geographic data may include an estimated gradient of a surface that transportation will travel along, such as a road. Geographic data may also include a road type, such as asphalt, dirt, and the like. In one or more embodiments, condition data may include information related to a surrounding environment during transportation of the transport and transportation vehicle. In another example, and without limitation, condition data may include a road condition, such as icy, snow-covered, wet, and the like. Predetermined data 132 may further include costs related to the shipment of the freight. For example, predetermined data 132 may include estimated costs to transport a freight. The cost included in predetermined data may be estimated costs based on previously estimated transport routes and previously inputted freight data. Additionally, without limitation, more descriptions on predetermined data 132 may be found in U.S. patent application Ser. No. 18/426,217, filed on Jan. 29, 2024, and entitled "APPARATUS AND METHOD FOR LINE HAUL LOGISTICS MANAGEMENT," the entirety of which is incorporated by reference herein in its entirety.

Still referring to FIG. 1, the processor 112 may receive the predetermined data 132 from a database 128. Database 128 may be implemented, without limitation, as a relational database, a key-value retrieval database such as a NOSQL database, or any other format or structure for use as a database 128 that a person skilled in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in a database 128 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Continuing to reference FIG. 1, processor 112 may use a machine learning module, such as an adjusted waybill machine learning module, to implement one or more algorithms or generate one or more machine-learning models, such as adjusted waybill machine learning model 132, to calculate at least one adjusted waybill data. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database 128, such as any database 128 described in this disclosure, or be provided by a user. In other embodiments, a machine-learning module may obtain a training set by querying a communicatively connected database 128 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Adjusted waybill machine learning module may be used to adjusted waybill machine learning model 132 and/or any other machine learning model using training data. Adjusted waybill machine learning model 132 may be trained by correlated inputs and outputs of training data. Training data may be data sets that have already been converted from raw data whether manually, by machine, or any other method. Training data may include previous outputs such that adjusted waybill machine learning model iteratively produces outputs. Adjusted waybill machine learning model 132 using a machine-learning process may output converted data based on input of training data. In an embodiment, analyzing the user profile comprising the plurality of user related data may include determining the adjusted waybill data 144 using a machine learning model, such as adjusted waybill machine learning model 132 generated by adjusted waybill machine learning module. Adjusted waybill machine learning model 132 may be trained by training data, discussed in further detail below, such as adjusted waybill training data. Adjusted waybill training data may be stored in database 128.

With continued reference to FIG. 1 is configured to generate an adjusted waybill data. For the purposes of this disclosure, "adjusted waybill data" is data representing characteristics and/or information related to the process of transporting a freight or cargo. For example, adjusted waybill data 144 may include the costs associated with the transportation of a cargo, the type of transport that will be used to transport the cargo, the destination of the cargo, various characteristics relating to the freight itself, the amount of time it may take the freight to reach a particular destination, and the like. Adjusted waybill data 144 may also include a projected shipping journey. "Projected shipping journey" as used in this disclosure is the path that the transport may need to take to get to a particular destination. For example, projected shipping journey may include stops along a particular path before the freight reaches its destination. Projected shipping journey may include time data (e.g., departure and arrival date of shipment), vehicle data (e.g., make and model of a vehicle), cargo data (e.g., dimensions of cargo, weight of cargo, and the like), rate data (e.g., rate of travel (mph)), geographical data (e.g., surface gradient, surface type, and the like), condition data (e.g., ambient temperatures, weather conditions, and the like). "Time data," for the purposes of this disclosure, is temporal information relating to the shipment of goods. In one or more embodiments, time data may include temporal information such as a date and time related to a shipment of goods. For example, and without limitation, time data a departure of a transportation vehicle with goods from an initial location, and time data may also include a date and time related to an arrival of a transportation vehicle with goods to a destination. Time data may also include temporal data related to intermediate stops or checkpoints of transportation vehicle during the shipment of goods. For the purposes of this disclosure, "vehicle data" is data related to a transport vehicle. In another example, and without limitation, vehicle data may include vehicle data related to the transportation vehicle (also referred to in this disclosure as a "vehicle") that is moving the freight of a customer. Vehicle data may include a make and model of the vehicle, current mileage, smog ratings, weight, dimensions, engine type of the transportation vehicle, and the like. For the purposes of this disclosure, "cargo data" is data relating to the freight desired to be transported by a transportation vehicle. In one or more embodiments, cargo data may include information related to goods desired by the customer to be transported by a transportation vehicle. Cargo data may include dimensions, weight, quantity, and the like of the goods. For the purposes of this disclosure, "rate data" is data concerning the rate of travel of a transport vehicle. In another example, and without limitation, in one or more embodiments, rate data includes information related to a rate of travel of a transportation vehicle moving goods desired by a customer. For example, and without limitation, rate data may include a 55-miles per hour speed of a transportation vehicle. In one or more embodiments, geographic data may include environmental or terrain information. For example, and without limitation, geographic data may include a gradient of a surface that transportation will travel along, such as a road. Geographic data may also include a road type, such as asphalt, dirt, and the like. In one or more embodiments, condition data may include information related to a surrounding environment traveled during shipment of transportation vehicle. In another example, and without limitation, condition data may include a road condition, such as icy, snow-covered, wet, and the like. In an embodiment, Projected shipping journey may comprise a plurality of stages. For example, a projected shipping journey may comprise a plurality of steps, wherein each step comprises the use of another transport vehicle based on travel time restrictions for transport vehicles, limitation of transport vehicles, and the like. In an embodiment, project shipping journey may be calculated using factors to optimize shipping, such as weather, traffic data, warehouse storage data, minimization of number of transport vehicle types, times between loading and unloading goods into transportation vehicles, and the like. Adjusted waybill data 144 may also include one or more projected shipping costs. "One or more projected journey costs" is the costs associated with each element of projected shipping journey. For example, the one or more projected journey costs may have a cost that is dependent on the time data, wherein the cost increases as a function of the time data. The cost associated with time data may, for example, include costs such as hourly wages to the drivers. Similarly, as another non-illustrative example, the one or more shipping costs may contain a cost that is dependent on the vehicle data described above, wherein a cost may be calculated based on the price, capabilities, or efficiency of the vehicle. Additionally without limitation, more descriptions on adjusted waybill data 144 may be found in U.S. patent application Ser. No. 18/426,217, filed on Jan. 29, 2024, and entitled "APPARATUS AND METHOD FOR LINE HAUL LOGISTICS MANAGEMENT," the entirety of which is incorporated by reference herein in its entirety.

With further reference to FIG. 1, generating the adjusted waybill data comprises receiving adjusted waybill training data 148. In an embodiment, adjusted waybill training data 148 may include a plurality of adjusted waybill data that are each correlated to one of a plurality of freight data. For example, adjusted waybill training data 148 may be used to show that freight data may indicate a particular adjusted waybill data. Adjusted waybill training data 148 may be retrieved from database 128 or the like as described above. Generating the adjusted waybill data 144 further comprises training an adjusted waybill machine learning model 136 as a function of the adjusted waybill training data 148. Further, generating the adjusted waybill data 144 includes generating at least one adjusted waybill data 144 using the adjusted waybill machine learning model 136. In one or more embodiments, adjusted waybill machine learning model 136 may be iteratively trained wherein a user may input actual costs, actual delivery, and the like. In one or more embodiments, waybill machine learning model 136 may be iteratively trained wherein a user may indicate that costs were too high, the projected transport journey was incorrect and the like. In one or more embodiments, adjusted waybill data 144 may include the price to ships goods. In one or more embodiments, a user may indicate that a minimum profit margin must be met when shipping goods. In one or more embodiments, following delivery fo the freight, processor 112 may be configured to compare adjusted waybill data 144 to the minimum profit margin to determine if the price given reflected the user's costs. In one or more embodiments, waybill machine learning model 136 may be iteratively trained based on user feedback. In one or more embodiments, waybill machine learning model 136 may be iteratively trained using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device may generate a web crawler to costs of transport, transport journeys and the like from a plurality of freight logistic entities. The web crawler may be seeded and/or trained with a reputable website to begin the search. A web crawler may be generated by a processor. In some embodiments, the web crawler may be trained with information received from an external user through a user interface. In one or more embodiments, the web crawler may be used to determine prices given by other transport entities. In one or more embodiments, processor may be configured to receive updated costs and the like from web crawler and train machine learning model to adjust prices. In one or more embodiments, waybill machine learning model 136 may be trained based on other costs or practices within the industry in order to maximize consumers and maximize efficiency. In one or more embodiments, waybill machine learning model 136 may be trained as a function of the web crawler wherein waybill machine learning model 136 may trained based on improvements made within the industry that can allow for faster shipping routes, more accurate shipping times, more competitive rates and the like.

Still referring to FIG. 1, the memory 116 contains instructions configuring the processor 112 to compare the adjusted waybill data 144 to predetermined data 132. A set of discrepancy data may be generated as a result of the comparison. The discrepancy data may include data relating to any discrepancies between the predetermined data 132 and the adjusted waybill data 144. For example, the discrepancy data may contain data relating to the discrepancies between costs found in the predetermined data 132 and costs calculated in the adjusted waybill data 144. A user may be notified of any discrepancies such as cost increases, freight weight changes, freight dimension changes and the like.

Still referring to FIG. 1, the memory 116 may contain instructions configuring the processor 112 to compare the adjusted waybill data 144 to a "a set of preconfigured freight thresholds" for each element within the adjusted waybill data 144. For the purposes of this disclosure, "set of preconfigured freight thresholds" is one or more values of a freight chosen in advance where a limit is established to trigger an action or response. For example, set of preconfigured freight thresholds may include values associated with costs, time of a shipment or a weight. Each threshold may be established by one or more user inputs. In some embodiments, a user may receive a notice or an update when an element of the adjusted waybill data 144 exceeds an element in the set of preconfigured freight thresholds. For example, if a cost element in the adjusted waybill data 144 exceeds a cost element associated with the set of preconfigured freight thresholds, the memory 116 may configure the processor 112 to send a notice the user.

Still referring to FIG. 1, in some embodiments, processor 112 may generate the set of preconfigured freight thresholds using a threshold machine-learning model. For the purposes of this disclosure, a "threshold machine-learning model" is a machine-learning model that is configured to calculate freight thresholds. Threshold machine-learning model may be generated using methods described in this disclosure. For example, and without limitation, threshold machine-learning model may be generated using inputs, such as freight data 120 and predetermined data 132, correlated to outputs, such as the set of preconfigured freight thresholds. Generating the set of preconfigured freight thresholds using a threshold machine learning model may include receiving threshold training data. In an embodiment, threshold training data may include a plurality of freight data that are correlated to a plurality of predetermined data 132. For example threshold training data may be used to determine that a particular freight may be heavy for a particular transport due to weight constraints. As another non-limiting example, threshold training data may be used to determine that a particular transport is too costly for a particular freight. Threshold training data may be provided by a database 128, previous iterations, or the like as described in this disclosure. In one or embodiments, set of preconfigured freight thresholds may be provided by a database 128 of computing device 104 or third party application. In various embodiments, set of preconfigured freight thresholds may be inputted into computing device 104 by a user using, such as, for example, a peripheral input device (e.g., keyboard) or an integrated input component (e.g., touchscreen of computing device). For example, and without limitation, a user may input set of preconfigured freight thresholds into computing device 104 via graphical user interface or web application using a keyboard. In other embodiments, set of preconfigured freight thresholds may be provided from historical data, such as data collected by sensors or past recorded data related to similar shipments. For example, and without limitation, one or more sensors communicatively connected to computing device 104 may detect mileage data (e.g., a mileage) of a vehicle and transmit the data to computing device 104 for storage in database 128. In other embodiments, set of preconfigured freight thresholds may be retrieved from a remote database 128, such as, for example, a website, academic database, government database, or the like.

Still referring to FIG. 1, the memory 116 may contain instructions configuring the processor 112 to display an alert related to the adjusted waybill data 144 as presentation content, as a function of the comparison between the adjusted waybill data 144 and the set of preconfigured freight thresholds. For the purposes of this disclosure, "presentation content" is a content that conveys information to viewers. As a non-limiting example, presentation content may include a running average, previous data, real-time data, and the like. For the purposes of this disclosure, "running average" is average freight information of a vehicle. For the purposes of this disclosure, "previous data" is the previous data associated with a freight. For the purposes of this disclosure, "real-time data" is data of a freight taken in real-time. In some embodiments, alert may display presentation content in one or more visual or audio formats. As a non-limiting example, presentation format may be in one or more displayable images, graphical representations, animations, videos, audiovisuals, graphs, pie charts, bar charts, trend lines, and the like. In some embodiments, the presentation content may be displayed on multiple windows and/or multiple displays. In some embodiments, the processor 112 may display alert on a mobile display device using a network. As a non-limiting example, the mobile display device may include a mobile phone, smartphone, tablet, laptop, desktop computer, vehicle dashboard, and the like. For the purposes of this disclosure, a "network" consists of two or more computing systems that are linked in order to transport and share data. In some embodiments, the presentation content may include a running average, previous data, real-time data, and the like in one or more visual or audio formats. In some embodiments, alert may inform an operator recommended solutions for a plurality of actions which caused the adjusted waybill data 144 to exceed the set of preconfigured freight thresholds. As a non-limiting example, an alert may display a set of preconfigured freight thresholds with values that may be generated using an Adjusted waybill machine learning model 136. As a non-limiting example, an alert may inform an operator to decrease costs or time frames associated with a particular freight by changing the modes of transportation or dividing a freight into multiple freights. Additionally, or alternatively, processor 112 may be configured to generate a deviation notification to the user as a function of comparing the adjusted waybill data 144 to the set of preconfigured freight thresholds. In an exemplary embodiment, processor 112 may be configured to generate deviation notification when an element of the adjusted waybill data 144 exceeds an element of the set of preconfigured freight thresholds. Such a deviation notification may be configured to notify a user that a transport has exceeded an allowable amount of deviation of a transport and/or an issue with the transport exists and may need to be addressed. In an embodiment, deviation notification may be an audiovisual alert, text-based alert, and the like.

Continuing to refer to FIG. 1, the memory 116 contains instructions configuring the processor 112 to determine an updated freight schedule 152 as function of the adjusted waybill data 144 and the freight data 120. For the purposes of this disclosure, "updated freight schedule" is an updated schedule or updated requirements for a particular freight. "updated schedule" as used in this disclosure refers to the shipping schedule of a freight. Updated schedule may include a shipping route, estimated time of the route, estimated time of departures, the shipping method to be used and the like. For example, A freight may require an updated schedule when freight data 120 indicates that the freight is too large for a particular transport. "Updated requirement" as used in this disclosure refers to various requirements that are necessary to move a particular freight. For example, freight data 120 may indicate that the freight may be too heavy for certain transports and therefore a different transport may be required to move the freight. Updated requirements may include instructions or warnings for handling a particular product, specific packaging requirements, specific temperature requirements and the like. Additionally, an update requirement for a particular freight may need to be determined when a threshold has been exceeded. For example, a cheaper mode of transport may be required when a cost element associated with the adjusted waybill data 144 exceeds a cost element associated with the set of preconfigured freight parameters. Updated freight schedule 152 may contain one or more elements associated with the updated freight schedule 152. Updated freight schedule 152 may contain instructions on how to handle a particular freight, instructions for transporting a particular freight, warnings and precautions, changes made to already existing delivery routes such as time or direction, and the like. Updated freight schedule 152 may contain a destination data. As used in the disclosure "destination data" is data referring to the destination of the freight. As a non-limiting example, destination data may include data referring to the destination of the freight, the updated time of arrival, the mode of transportation, the procedures for handling and the like as described in this disclosure. Additionally, or alternatively, updated freight schedule 152 may contain a "journey data". Journey data as described in the disclosure is data referring to the journey route that the freight will take. Journey data may include data such as warnings along various routes, various safety procedures, speed limits, tolls, methods of transportation, stops along the routes, various detours that may need to be made and the like. Additionally without limitation, more descriptions on updated freight schedule 152 may be found in U.S. patent application Ser. No. 18/426,217, filed on Jan. 29, 2024, and entitled "APPARATUS AND METHOD FOR LINE HAUL LOGISTICS MANAGEMENT," the entirety of which is incorporated by reference herein in its entirety.

With further reference to FIG. 1, determining the updated freight schedule 152 as function of the adjusted waybill data 144 and the freight data 120 may comprise determining the updated freight schedule as a function of the adjusted waybill data 144 and the freight data using a machine learning model. Further, determining the updated freight schedule as a function of the adjusted waybill data 144 and the freight data may include receiving updated freight training data. In an embodiment, updated freight training data may include a plurality of adjusted waybill data that is correlated to a plurality of updated freight schedules. For examples. Updated freight training data may be used to show indicate that adjusted waybill data 144 may be used to indicate a particular updated freight schedule 152. In an exemplary embodiment, as described above, the updated freight schedule may indicate a new route, new shipping destination, new transport, or the like as determined by the adjusted waybill data 144. In a further embodiment, updated freight training data may also include a plurality of freight data and correlated adjusted waybill data 144 that are correlated to a plurality of updated freight schedules. In such an embodiment, updated freight training data may be used to show how freight data and the correlated adjusted waybill data 144 may indicate a particular updated freight schedule. Updated freight training data may be retrieved from database 128, user input or the like as described in this disclosure. Updated freight training data may also be retrieved from user entered inputs, previous iterations of this method or previously generated updated freight schedules. Determining the updated freight schedule using a machine learning model may further include training an updated freight learning model 156 as a function of updated freight schedule training data. Further, determining updated freight schedule using a machine learning model may also include determining at least one updated freight schedule 144 using trained updated freight schedule machine learning model 132.

With further reference to FIG. 1, transmitting the updated freight schedule 152 and the user adjusted waybill data 144 may comprise processor 112 storing, the updated freight schedule 152, and adjusted waybill data 144 on an immutable sequential listing 160, such as immutable sequential listing 200. An "immutable sequential listing" as used in this disclosure, is a data structure that places data entries in a fixed sequential arrangement, such as a temporal sequence of entries and/or blocks thereof, where the sequential arrangement, once established, cannot be altered, or reordered. For example, the updated freight schedule 152 may be configured into at least one block of data to be stored on the immutable sequential listing 160. As describe herein, an immutable sequential listing 160 may include and/or implement an immutable ledger, where data entries that have been posted to immutable sequential listing 160 cannot be altered. Data elements are listings in immutable sequential listing 160; data elements may include any form of data, including transportation data, the updated freight schedule 152, and progress data, textual data, image data, encrypted data, cryptographically hashed data, and the like.

With continued reference to FIG. 1, Additionally or alternatively, transmitting the updated freight schedule 152 and the user adjusted waybill data 144 may further comprise executing a smart contract 164. A "smart contract" as used in this disclosure is a computer program stored on an immutable sequential listing 160 which verifies and executes its terms upon the occurrence of predetermined events. For example, a smart contract 164 may execute a payment upon the occurrence of freight data 120 being transmitted to an immutable sequential listing 160 stated above. Smart contracts may be used to automate the execution of an agreement to create a more efficient and streamlined transport process. For instance, smart contracts may be used for transport by immediately receiving a payment upon the transport of a freight.

With continued reference to FIG. 1, apparatus 100 contains a device display 168 communicatively connected to the pressor, the device display 168 configured to output the updated freight schedule 152 and the adjusted waybill data 144. A "display device," for the purposes of this disclosure, is a device that is capable of displaying data in a visual manner. Display device may include, as non-limiting examples, a television, a computer monitor, an LCD screen, an OLED screen, a CRT screen, and the like. Display device may be communicatively connected to computing device 104. In some embodiments, display device may be local (located on the same network) to computing device 104. In some embodiments, display device may be remote (located on a different network) to computing device 104. In some embodiments, With continued reference to FIG. 1, computing device 104 may transmit adjusted waybill data 144, updated freight schedule 152 and the like to a second remote device. Second remote device may be consistent with display device as disclosed in this disclosure. In some embodiments, computing device 104 may command remote device 108 to display adjusted waybill data 144 and updated freight data 120.

Figure 2:
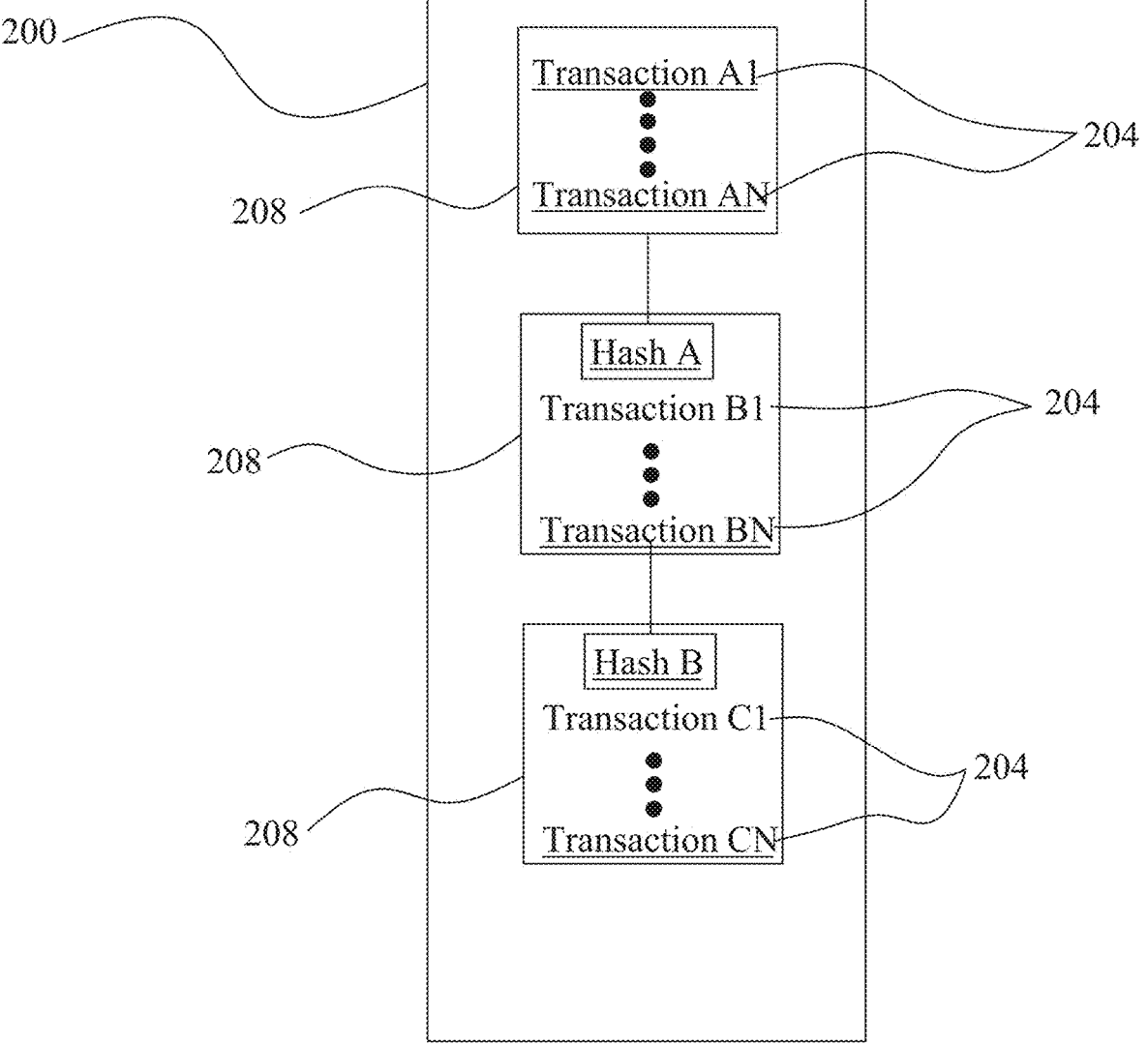
FIG. 2 is a block diagram of exemplary embodiment of an immutable sequential listing in accordance with one or more embodiments of the present disclosure.

Referring now to FIG. 2, an exemplary embodiment of an immutable sequential listing is illustrated 200. An immutable sequential listing 200 may be, include and/or implement an immutable ledger, where data entries that have been posted to immutable sequential listing 200 cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof process as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory 116 of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2, immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device 104 may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
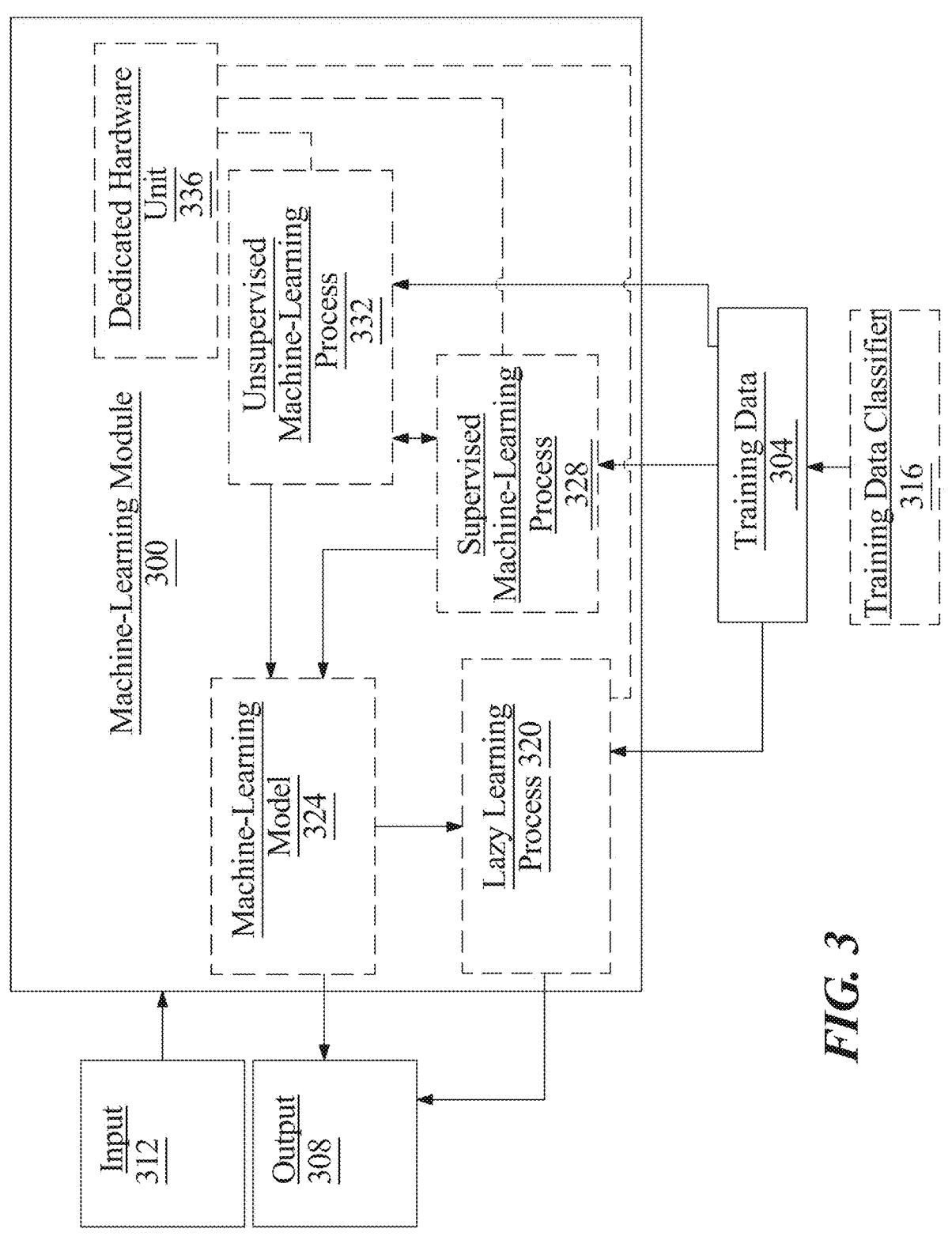
FIG. 3 is a block diagram of exemplary embodiment of a machine learning module in accordance with one or more embodiments of the present disclosure.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats link-ing positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as freight request, freight data and the like and outputs may include outputs such as adjusted waybill data, updated freight schedule and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to groups such as cities, regions, geographical terrain, states, countries and the like.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as freight data, freight request and the like as described above as inputs, adjusted waybill data, updated freight schedule and the like as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, pro-duction and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
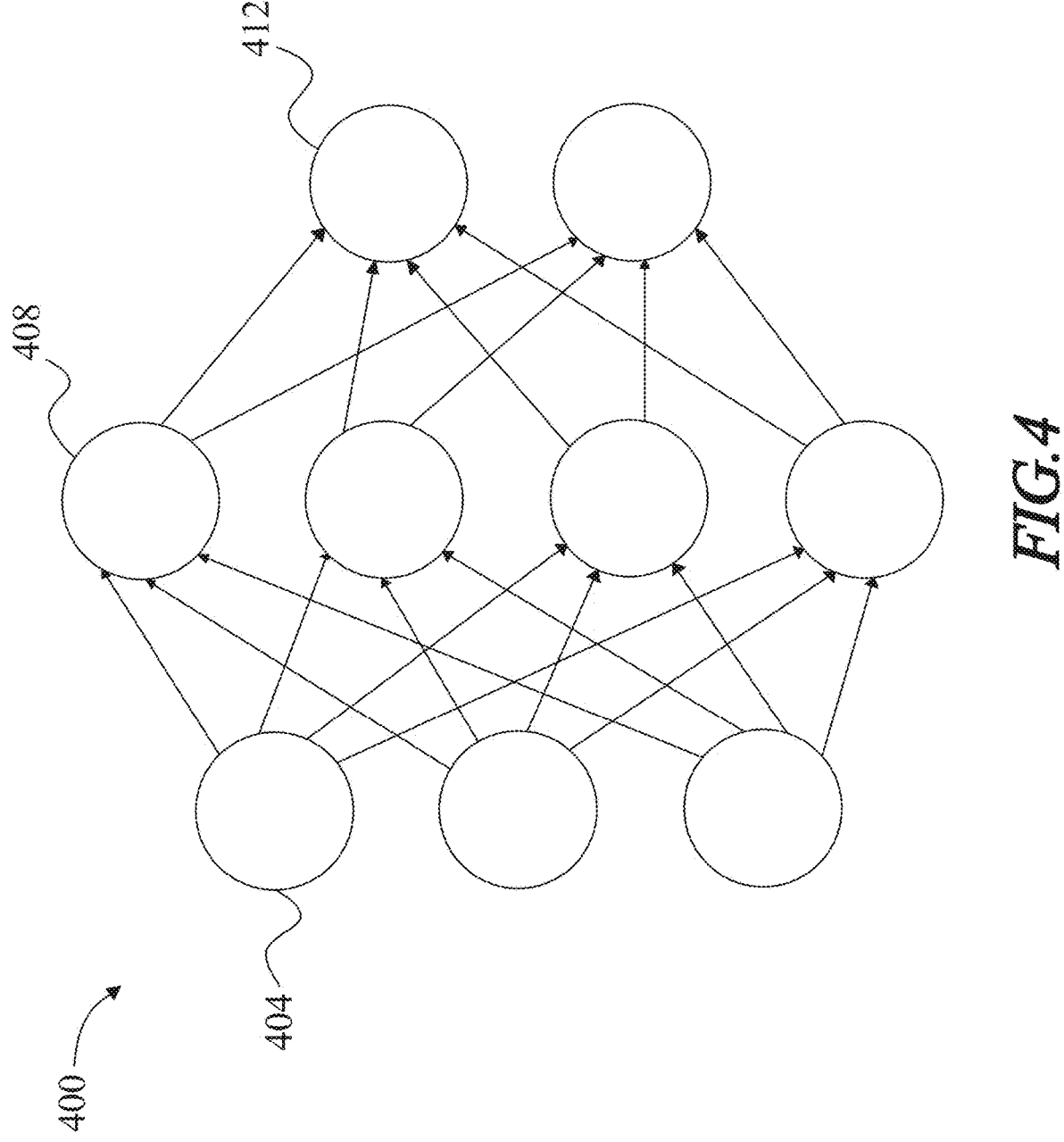
FIG. 4 is a diagram of an exemplary nodal network in accordance with one or more embodiments of the present disclosure.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
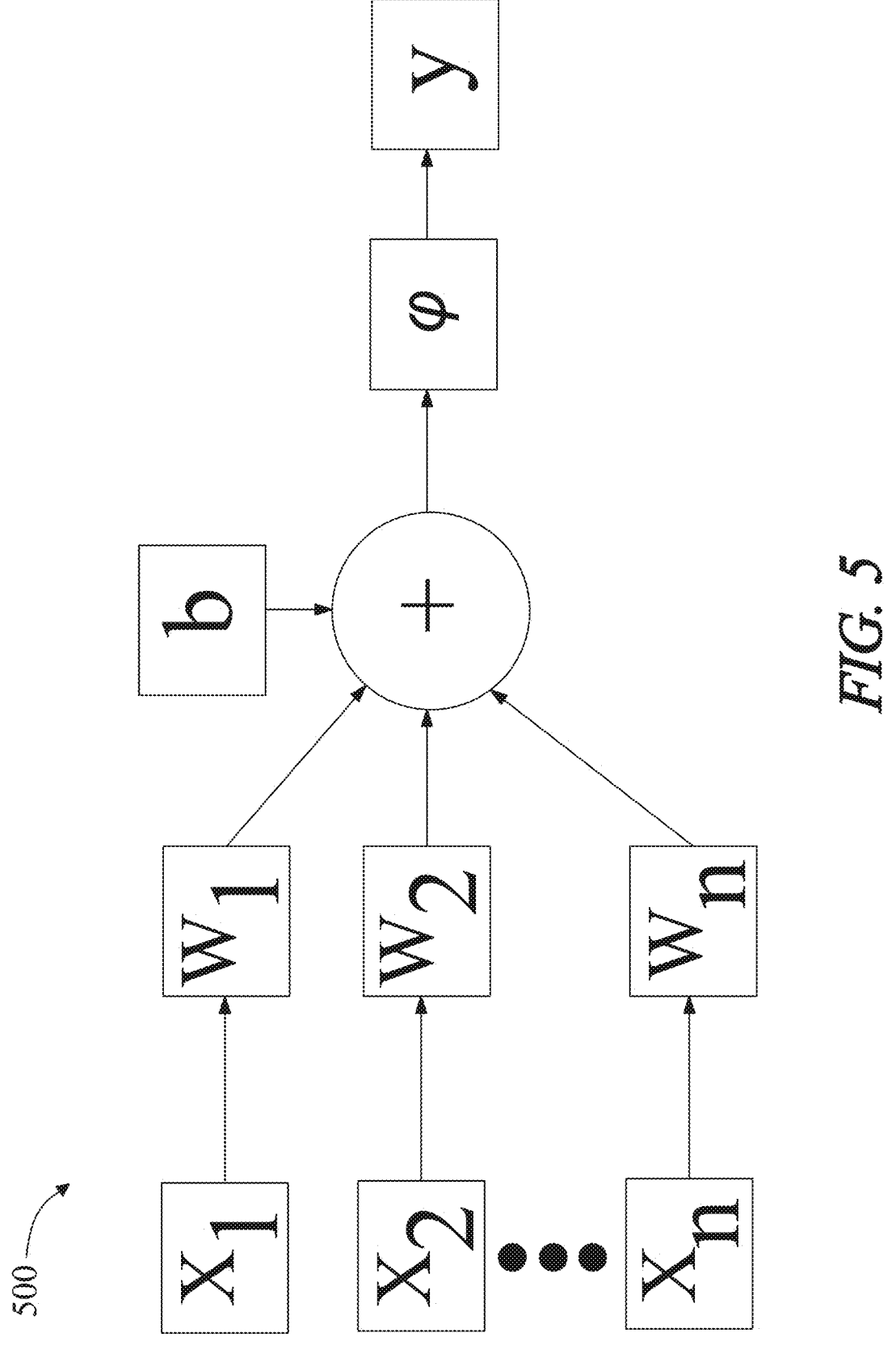
FIG. 5 is a block diagram of an exemplary node in accordance with one or more embodiments of the present disclosure.

Referring now to FIG. 5, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 6:
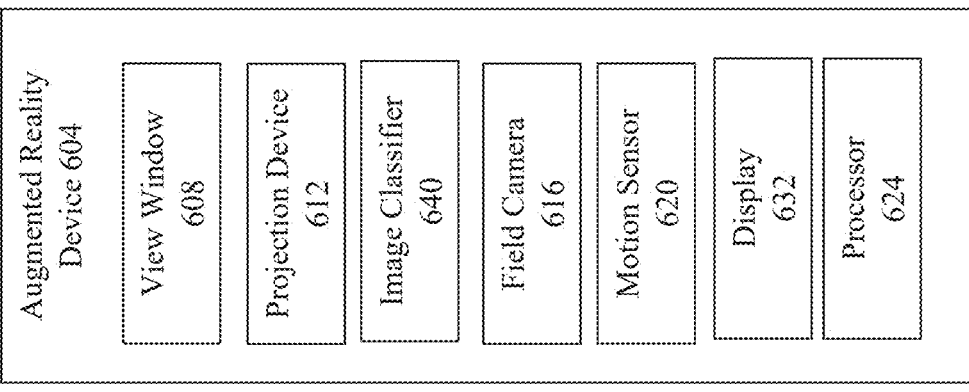
FIG. 6 is a block diagram of exemplary embodiment of an augmented reality device in accordance with one or more embodiments of the present disclosure.

Referring now to FIG. 6, an exemplary embodiment of a system 600 for an augmented reality device is illustrated. System may include augmented reality device 604. Augmented reality device 604 may include a view window 608, defined for the purposes of this disclosure as a portion of the augmented reality device 604 that admits a view of field of vision; view window 608 may include a transparent window, such as a transparent portion of goggles such as lenses or the like. Alternatively, view window 608 may include a screen that displays field of vision to user. Augmented reality device 604 may include a projection device 612, defined as a device that inserts images into field of vision. Where view window 608 is a screen, projection device 612 may include a software and/or hardware component that adds inserted images into a display signal to be rendered on the display 632. Projection device 612 and/or view window 608 may make use of reflective waveguides, diffractive waveguides, or the like to transmit, project, and/or display 632 images. For instance, and without limitation, projection device 612 and/or display 632 may project images through and/or reflect images off an eyeglass-like structure and/or lens piece, where either both field of vision and images from projection device 612 may be so displayed, or the former may be permitted to pass through a transparent surface. Projection device 612 and/or view window 608 may be incorporated in a contact lens or eye tap device, which may introduce images into light entering an eye to cause display of such images. Projection device 612 and/or view window 608 may display 632 some images using a virtual retina display 632 (VRD), which may display 632 an image directly on a retina of an operator generating the freight data 120.

Still referring to FIG. 6, augmented reality device 604 may be implemented in any suitable way, including without limitation incorporation of or in a head mounted display 632, a head-up display, a display 632 incorporated in eyeglasses, googles, headsets, helmet display 632 systems, or the like, a display 632 incorporated in contact lenses, an eye tap display 632 system including without limitation a laser eye tap device, VRD, or the like. Persons skilled in the art, upon reviewing the entirety of this disclosure, will be aware of various optical projection and/or display 632 technologies that may be incorporated in augmented reality device 604 consistently with this disclosure.

Further referring to FIG. 6, view window 608, projection device 612, and/or other display 632 devices incorporated in augmented reality device 604 may implement a stereoscopic display 632. A "stereoscopic display 632," as used in this disclosure, is a display 632 that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display 632. Stereoscopic display 632 may display 632 two flat images having different perspectives, each to only one eye, which may simulate the appearance of an object or space as seen from the perspective of that eye. Alternatively, or additionally, stereoscopic display 632 may include a three-dimensional display 632 such as a holographic display 632 or the like. Persons skilled in the art, upon reviewing the entirety of this disclosure, will be aware of various alternative or additional types of stereoscopic display 632 that may be employed in augmented reality device 604.

Continuing to refer to FIG. 6, augmented reality device 604 may include a field camera 616. Field camera 616 may include a single camera and/or two or more cameras used to capture field of vision; for instance, and without limitation, the two or more cameras may capture two or more perspectives for use in stereoscopic and/or three-dimensional display 632, as described above. Field camera 616 may capture a feed including a plurality of frames, such as without limitation a video feed. For example, field camera 616 may capture the plurality of frames of a freight.

Still referring to FIG. 6, augmented reality device 604 may include at least a motion sensor 620. At least a motion sensor 620 may include, without limitation, a microelectro-mechanical system (MEMS) sensor. At least a motion sensor 620 may include, without limitation, an inertial measurement unit (IMU). At least a motion sensor 620 may include one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. At least a motion sensor 620 may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. At least a motion sensor 620 may include, without limitation magnetic sensors such as Hall effect sensors, compasses such as solid-state compasses, or the like. Persons skilled in the art, upon reviewing the entirety of this disclosure, will be aware of various components and/or devices that may be used as at least a motion sensor 620 consistently with this disclosure.

Augmented reality device 604 may include a processor 624. Processor 624 may include and/or be included in any computing device 104 as described in this disclosure, including without limitation a microcontroller, microprocessor, digital signal processor (DSP) and/or system on a chip (SoC) as described in this disclosure.

Still referring to FIG. 6, processor 624 may include a device and/or component incorporated in and/or attached to augmented reality device 604. For instance, processor 624 may include a microcontroller, system on chip, FPGA, or other compact hardware element that is incorporated in and/or attached to augmented reality device 604. Alternatively, or additionally, processor 624 may include a device communicating with augmented reality device 604 via a wireless and/or wired connection. In an embodiment, processor 624 may include a device incorporated in augmented reality device 604 and a device communicating therewith via wired and/or wireless connection.

Still referring to FIG. 6, augmented reality device 604 may be configured to generate and/or classify images using an image classifier 640. A "classifier," as used in this disclosure is a machine-learning model, such as a mathematical model, neural net, or program generated by a machine learning algorithm known as a "classification algorithm," as described in further detail above, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a process whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, kernel estimation, learning vector quantization, and/or neural network-based classifiers.

Still referring to FIG. 6, image classifier 640 may be generated, as a non-limiting example, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Further referring to FIG. 6, an object and/or shape identified using image classifier 640 may be assigned an object identifier by augmented reality device 604. Computing device 104 may further record one or more sets of coordinates describing location of an identified object; coordinates may include a set of coordinates of an approximate geometric center of object, coordinates of a plurality of vertices of polygonal approximations of surface features, or the like. Any such coordinates and/or object identifier may be transmitted to augmented reality device 604.

Still referring to FIG. 6, Image Classifier 640 may further be utilized to calculate image-based measurements. "Image-based measurement" as used in the disclosure refers to the generation of physical measurements of a specific object in an image. For example, an image of a freight may be used to determine the height, width and length of the freight using image-based measurements. Computing device 104 may generate image-based measurements using a measurement algorithm, defined as a process whereby computing device 104 derives a measurement from training data using a machine learning model as described above.

As described above, apparatus 100 may include augmented reality device 604. Augmented reality device may be used to acquire freight data 120. Augmented reality device 604 may be used to capture a field of vision of the freight using field camera 616 wherein augmented reality device 604 is configured to classify images or objects within the captured field of vision. Computing device 104 may then be utilized to generate the image-based measurement and output a plurality of measurements related to freight. Image-based measurements may include measurements relating to dimensions (length, width, height), material properties, density, and the like. Further computing device 104 may be utilized to calculate a freight weight based on the density, the material properties and the dimensions of the freight.

Referring now to FIG. 7, a flow diagram of an exemplary method 700 for freight logistics management is illustrated. At step 705, method 700 includes receiving, by at least a processor, a freight data 120 associated with a freight request 124. In an embodiment, receiving the freight data 120 may include operating an augmented reality device wherein the augmented reality device may be utilized to calculate the freight data 120. This may be implemented as described and with reference to FIGS. 1-7.

With continued reference to FIG. 7, at step 710, method 700 includes receiving by the at least a processor, predetermined data 132. In an embodiment, predetermined data 132 may include data received from a database, user input, an input device or the like as described above. Further, predetermined data 132 may include data relating to previous transport invoices including freight data 120 and shipping data. This may be implemented as described and with reference to FIGS. 1-7.

With continued reference to FIG. 7, at step 715, method 700 includes generating, by the at least a processor, an adjusted waybill data 144. Generating the adjusted waybill data 144 comprises receiving an adjusted waybill training data 148 comprising a plurality of freight data correlated to a plurality of adjusted waybill data, training an adjusted waybill machine learning model 136 as a function of the adjusted waybill training data 148 and generating the adjusted waybill data 144 using the adjusted waybill machine learning model 136. These may be implemented as described and with reference to FIGS. 1-7.

With continued reference to FIG. 7, As step 720, method 700 includes comparing by the at least a processor, the freight data 120 with a predetermined data 132. These may be implemented as described and with reference to FIGS. 1-7.

With further reference to FIG. 7, at step 725, method 700 includes determining, by the at least a processor, an updated freight schedule 152 as a function of the adjusted waybill data 144 and the freight data 120. These may be implemented as described and with reference to FIGS. 1-6.

Still referring to FIG. 7, at step 730, method 700 includes transmitting, by the at least a processor, the adjusted waybill data 144 and the updated freight schedule 152. In an embodiment, transmitting the adjusted waybill data 144 and the updated freight schedule 152 may further comprise storing the adjusted waybill data 144 and the updated freight schedule 152 on an immutable sequential listing. Additionally, or alternatively, transmitting the adjusted waybill data 144 and the updated freight schedule 152 may further comprise executing a smart contract 164. This may be implemented as described and with reference to FIGS. 1-7.

Continuing to refer to FIG. 7, at step 735, method 700 includes displaying, by the at least a processor, the updated freight schedule 152, and the adjusted waybill data 144 on a device display 168. In an embodiment, displaying the updated freight schedule 152 transmitting the adjusted waybill data 144 may comprise using a graphical user interface. These may be implemented as described and with reference to FIGS. 1-7.

It is to be noted that any one or more of the aspects and embodiments described herein may be conveniently implemented using one or more machines (e.g., one or more computing devices that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 8:
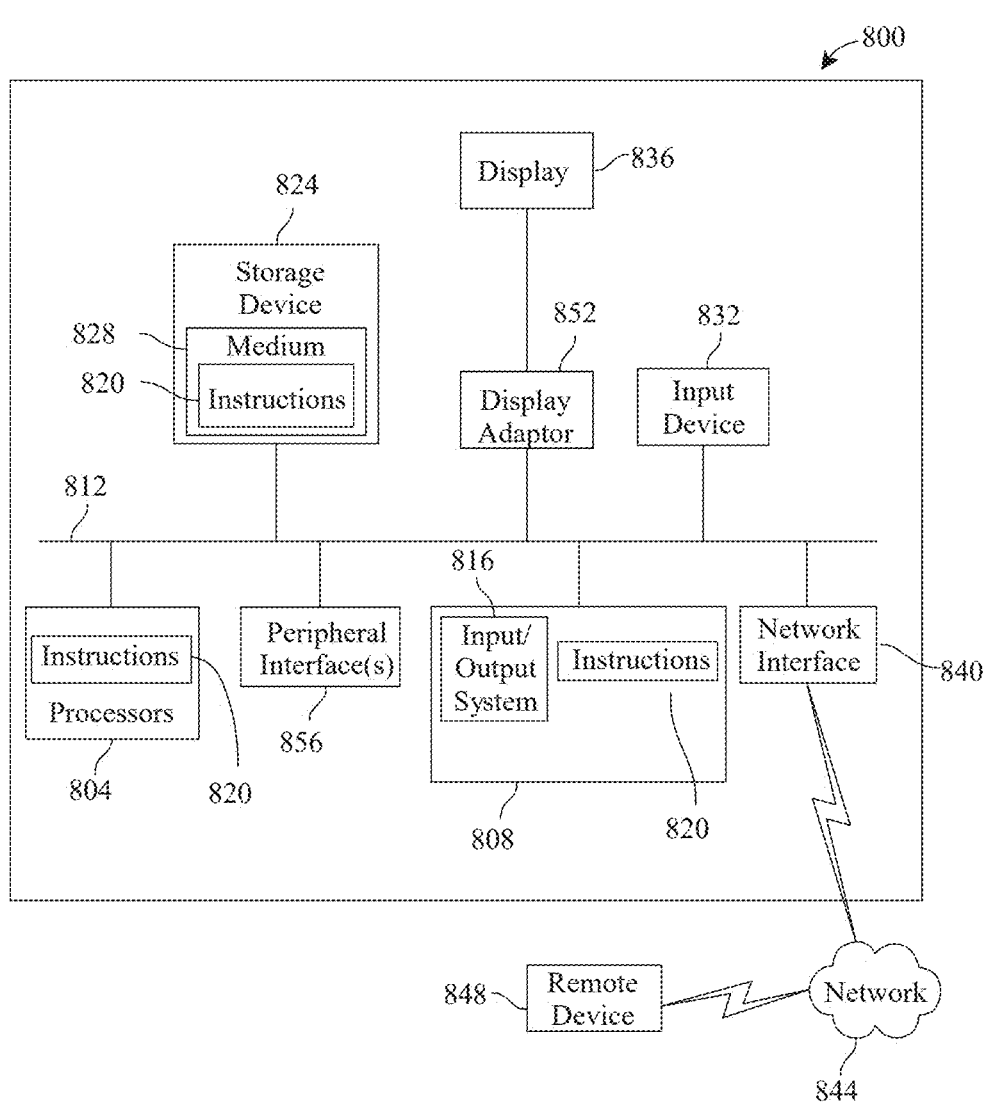
FIG. 8 is a block diagram of a computing system that can be used to implement any one or more of the methodologies disclosed herein and any one or more portions thereof.

FIG. 8 shows a diagrammatic representation of one embodiment of a computing device 104 in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for freight logistics management, the apparatus comprising:

at least a processor;

a memory communicatively connected to the at least a processor, the memory comprising instructions configuring the at least a processor to:

receive freight data associated with a freight request for a transport, wherein the freight data comprises a weight data and an inspection data;

obtain predetermined data;

receive adjusted waybill training data comprising examples of freight data correlated to examples of adjusted waybill data;

sanitize the adjusted waybill training data using a dedicated hardware unit comprising circuitry configured to perform signal processing operations, wherein sanitizing the adjusted waybill training data comprises:

determining by the dedicated hardware unit that a training data entry of the adjusted waybill training data has a signal to noise ratio below a threshold value;

removing the training data entry from the adjusted waybill training data to create sanitized adjusted waybill training data;

down-sampling the sanitized adjusted waybill training data through a compressor hardware of the at least a processor;

generate adjusted waybill data as a function of the freight data, wherein generating the adjusted waybill data comprises:

receiving the sanitized adjusted waybill training data;

training an adjusted waybill machine learning model as a function of the sanitized adjusted waybill training data, wherein training the adjusted waybill machine learning model comprises:

updating the adjusted waybill training data as a function of inputs and outputs of a previous iteration of the adjusted waybill machine learning model; and retraining the adjusted waybill machine learning model using the updated sanitized adjusted waybill training data; and generating the adjusted waybill data using the adjusted waybill machine learning model;

compare the predetermined data to the adjusted waybill data;

determine an updated freight schedule as function of the adjusted waybill data and the freight data, wherein determining the updated freight schedule comprises training an updated freight machine learning model based on updated freight schedule training data;

transmit the updated freight schedule and the adjusted waybill data; and a device display communicatively connected to the at least a processor, the device display configured to output the updated freight schedule and the adjusted waybill data.

2. The apparatus of claim 1, further comprising a remote device communicatively connected to the processor, the remote device configured to receive the freight data.

3. The apparatus of claim 1, wherein generating the adjusted waybill data comprises determining a projected shipping journey and one or more projected journey costs.

4. The apparatus of claim 3, the projected shipping journey comprising a plurality of stages.

5. The apparatus of claim 1, wherein comparing the freight data with the predetermined data comprises comparing the freight data to a set of preconfigured freight thresholds.

6. The apparatus of claim 5, wherein the set of preconfigured freight thresholds comprises a predetermined deviation of weight between the freight data and the predetermined data.

7. The apparatus of claim 1, wherein transmitting the updated freight schedule and the adjusted waybill data comprises storing the adjusted waybill data and the updated freight schedule on an immutable sequential listing.

8. The apparatus of claim 7, wherein transmitting the updated freight schedule and the adjusted waybill data further comprises executing a smart contract.

9. A method of freight logistics management, the method comprising:

receiving, by at least a processor, a freight data associated with a freight request, wherein the freight data comprises a weight data and an inspection data;

receiving, by the at least a processor, a predetermined data;

receiving, by the at least a processor, adjusted waybill training data comprising examples of freight data correlated to examples of adjusted waybill data;

sanitizing the adjusted waybill training data using a dedicated hardware unit comprising circuitry configured to perform signal processing operations, wherein sanitizing the adjusted waybill training data comprises:

determining by the dedicated hardware unit that a training data entry of the adjusted waybill training data has a signal to noise ratio below a threshold value;

removing the training data entry from the adjusted waybill training data to create sanitized adjusted waybill training data;

down-sampling the sanitized adjusted waybill training data through a compressor hardware of the at least a processor;

generating, by the at least a processor, adjusted waybill data, wherein generating the adjusted waybill data comprises:

receiving the sanitized adjusted waybill training data;

training an adjusted waybill machine learning model as a function of the sanitized adjusted waybill training data, wherein training the adjusted waybill machine learning model comprises:

updating the adjusted waybill training data as a function of inputs and outputs of a previous iteration of the adjusted waybill machine learning model; and retraining the adjusted waybill machine learning model using the updated sanitized adjusted waybill training data; and generating the adjusted waybill data using the adjusted waybill machine learning model;

comparing, by the at least a processor, the predetermined data to the adjusted waybill data;

determining, by the at least a processor, an updated freight schedule as a function of the adjusted waybill data and the freight data, wherein determining the updated freight schedule comprises training an updated freight machine learning model based on updated freight schedule training data;

transmitting, by the at least a processor, the updated freight schedule and the adjusted waybill data; and displaying, by the at least a processor, the updated freight schedule, and the adjusted waybill data on a device display.

10. The method of claim 9, wherein receiving, by the at least a processor, the freight data associated with the freight request comprises generating the freight data by a sensor communicatively connected to the at least a processor.

11. The method of claim 9, wherein generating, by the at least a processor, the adjusted waybill data further comprises determining a projected shipping journey and one or more projected journey costs.

12. The method of claim 11, the projected shipping journey comprising a plurality of stages.

13. The method of claim 11, wherein generating, by the at least a processor, the adjusted waybill data based on a comparison of the freight data and the predetermined data comprises comparing the freight data to a deviation threshold.

14. The method of claim 13, the deviation threshold comprising a predetermined deviation of weight between the freight data and the predetermined data.

15. The method of claim 9, wherein transmitting the updated freight schedule and the adjusted waybill data comprises storing the adjusted waybill data and the updated freight schedule on an immutable sequential listing.

16. The method of claim 15, wherein transmitting the updated freight schedule and the adjusted waybill data further comprises executing a smart contract.

* * * * *